United States Patent Office 3,390,245
Patented June 25, 1968

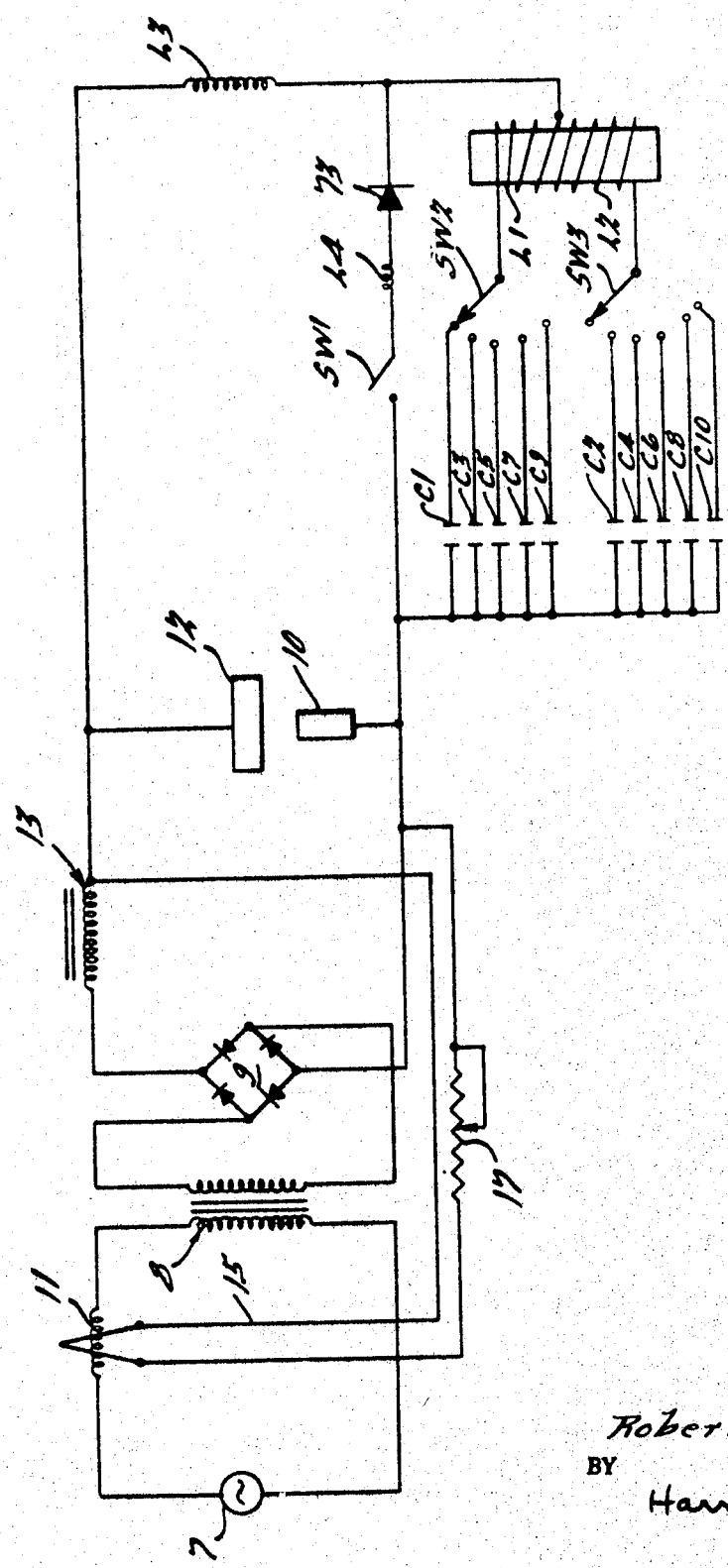

3,390,245
ELECTRICAL DISCHARGE MACHINING
POWER SUPPLY APPARATUS
Robert S. Webb, Bloomfield Hills, Mich., assignor, by mesne assignments, to Elox Inc., Troy, Mich., a corporation of Delaware
Filed Sept. 16, 1965, Ser. No. 487,784
8 Claims. (Cl. 219—69)

This invention relates generally to electrical discharge machining and, more particularly, to an improved machining power supply apparatus therefor.

In electrical discharge machining, electrical machining power pulses are passed between an electrode tool and a conductive workpiece through a dielectric fluid medium to provide stock removal at a precisely controlled rate and within close tolerance limits. The dielectric fluid utilized is a self-restoring, ionizable fluid such as kerosene, transformer oil, and the like. It has been found highly advantageous with certain combinations of electrode, workpiece materials, and gap polarity to utilize an electrical discharge machining power supply which furnishes main machining power pulses across the gap between electrode and workpiece, each of which is followed up by a series of higher frequency pulses of gradually diminishing amplitude. The follow-up pulses may be of the oscillatory type or of a like polarity to the main machining pulse but are so controlled and initiated by a gap resonant network that a greatly increased metal removal rate and improved surface finish are made possible.

It is the object of this invention to provide an improved electrical discharge machining power supply in which a source of machining power pulses is connected across the machining gap and in which a diode-inductance gap network and at least one resonant gap network are employed to facilitates the precise formation of follow-up pulses.

The unique features, additional objects and advantages of the present invention and the manner in which these may best be achieved will be more clearly understood by reference to the following detailed description of the invention when taken in connection with the accompanying drawing, in which:

The drawing is a schematic showing a relaxation oscillator type of electrical discharge machining power supply incorporating the present invention.

With more particular reference to the drawing, it will be seen that the machining gap, which is normally filled with a dielectric fluid during the electrical discharge machining process, comprises an electrode 10 of negative polarity and a workpiece 12 of positive polarity. The circuit as illustrated is operable to provide machining pulses across the gap between electrode 10 and workpiece 12.

An alternating current source 7 is employed to provide an alternating current input to transformer 8. The output of transformer 8 is rectified by bridge rectifier 9 with the pulsating output being provided to the gap through inductance 13. A saturable reactor 11 is included in the power supply circuit. Saturable reactor 11 has a control coil 15 with its terminals connected to the output of rectifier 9 and to the gap. A potentiometer 17 has its variable resistance connected as shown to selectively vary the DC level of control coil 15. When the discharge gap between electrode 10 and workpiece 12 becomes short circuited, the current of the control coil 15 is abruptly lowered, thus causing the impedance of the reactor to become high and to sharply lower the output of the power source.

A plurality of networks are selectively connectable across the gap to provide oscillatory follow-up pulses following each gap breakdown. Included in these networks are capacitors $C_1$–$C_{10}$ which are of differing magnitudes and connectable in series with inductances $L_1$ and $L_2$ by the selective setting of switches $SW_2$ and $SW_3$. I have found that optimum machining condition exists when a particular relationship is maintained between the magnitude of the inductances and capacitances between two networks of the same resonant frequency to provide an additive voltage effect. The basic relationship to be maintained is set forth as followings:

$$L_1C_1 = L_2C_2$$
$$C_1 > C_2 \text{ and } L_1 < L_2$$

When the respective values of capacitance and inductance are maintained as indicated above in the two complementary resonant networks, it was found that the machining rate was substantially improved.

Connected across the resonant networks $L_1C_1$, $L_2C_2$ etc. is a network comprising switch $SW_1$, diode 73 and inductances $L_3$ and $L_4$. The function of this network is to cut off the negative portions of the high frequency follow-up pulses and thus maintain the electrical discharge machining operation with all pulses of one polarity, as is preferable for use with certain electrode materials.

The present invention is concerned principally with this diode-inductance network and its parameters. The diode-inductance network has been found to contribute materially to the improvement of the follow-up pulses particularly when used in conjunction with a plurality of resonant gap networks as above described. In any electrical discharge power supply, there is present an inherent inductance of measurable quantity in the circuit due to the lead lengths necessarily utilized in making the gap connections. This inherent inductance is indicated by the inductance $L_3$. I have found that by connecting a unidirectional current conducting device such as diode 73 across the resonant network with the necessary inductance shown as $L_4$ maintained as small as possible by coaxial or parallel strip conductors, this improvement results so long as the following relationships between the magnitudes of the inductances is maintained:

$$L_4 < L_3 \text{ and } L_4 < L_3 < L_1 \text{ or } L_2$$

Normally the inherent inductance of $L_3$ is sufficient to preserve this relationship. However, it may be necessary to increase $L_3$ above the normal inherent value depending upon the magnitude of $L_4$.

It appears that the inductance-diode network contributes materially to the generation of separate and distinct follow-up pulses of gradually diminishing amplitude which serves to facilitate the machining process so long as this relationship in magnitude between the inductances present is maintained.

It will be seen from the foregoing specification and drawing that the electrical discharge machining power supply disclosed represents a substantial advance in the art. While the invention has been described as incorporated in a circuit for electrical discharge machining, it is not limited to that environment but may be used in any pulse generator in which a precisely generated pulse train of the character described is furnished to an electrical discharge device of non-linear impedance.

I claim:
1. In an electrical discharge machining apparatus for machining a conductive workpiece by a tool electrode across a dielectric filled gap, a source of machining pulses operatively connected to said gap, a first inductance and a unidirectional current conducting device connected in a series combination, at least one resonant network connected across said combination, said combination connected in series with a second inductance of greater magnitude than said first inductance across said gap to pro- vide unidirectional followup pulses after each of said machining pulses.

2. The combination as set forth in claim 1 in which a plurality of resonant LC networks are connected across said combination, each of said resonant networks having a different resonant frequency.

3. The combination as set forth in claim 1 in which a plurality of series resonant LC networks are connected across said combination.

4. The combination as set forth in claim 1 in which a plurality of resonant LC networks are connected across said combination, the magnitude of inductance in each of said plurality of networks being of a magnitude greater than that of said second aforesaid inductance.

5. In an electrical discharge machining apparatus for machining a conductive workpiece by a tool electrode across a dielectric filled gap, an alternating current supply, a rectifier connected between said supply and said gap, a saturable reactor connected between said supply and said rectifier, said reactor having its control coil connected to said gap for increasing its impedance responsive to gap short circuit, a first inductance and a unidirectional current conducting device connected in a series combination, at least one resonant network connected across said combination, said combination connected in series with a second inductance of greater magnitude than said first inductance across said gap.

6. A pulse generator for an electrical discharge load device of non-linear impedance characteristic comprising a source of spaced pulses operatively connected to said device, a first inductance and a diode connected in a series combination, at least one resonant network connected across said combination, said combination connected in series with a second inductance of greater magnitude than said first inductance across said load device to provide unidirectional followup pulses following each of said pulses.

7. The combination as set forth in claim 6 in which a plurality of resonant networks are connected across said combination, the magnitude of inductance of each of said plurality of networks being of a magnitude greater than that of said second aforesaid inductance.

8. The combination as set forth in claim 6 in which a plurality of series resonant LC networks are connected across said combinations.

References Cited

UNITED STATES PATENTS

| | | |
|---|---|---|
| 3,054,931 | 9/1962 | Inoue. |
| 3,087,044 | 4/1963 | Inoue. |
| 3,329,866 | 7/1967 | Webb. |

RICHARD M. WOOD, *Primary Examiner.*

R. F. STAUBLY, *Assistant Examiner.*